(12) United States Patent
Gattegno et al.

(10) Patent No.: US 8,612,737 B2
(45) Date of Patent: Dec. 17, 2013

(54) SYSTEM AND METHOD FOR SUPPORTING MULTIPLE HARDWARE PLATFORMS WITH A SINGLE DISK IMAGE

(75) Inventors: Yves Gattegno, L'Hay les Roses (FR); Philippe Auphelle, Ile de France (FR); Julien Rope, Ile de France (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 264 days.

(21) Appl. No.: 13/055,711

(22) PCT Filed: Sep. 4, 2008

(86) PCT No.: PCT/US2008/075205
§ 371 (c)(1),
(2), (4) Date: Jan. 24, 2011

(87) PCT Pub. No.: WO2010/027358
PCT Pub. Date: Mar. 11, 2010

(65) Prior Publication Data
US 2011/0125996 A1    May 26, 2011

(51) Int. Cl.
*G06F 9/00* (2006.01)
*G06F 15/177* (2006.01)
*G06F 9/44* (2006.01)
*G06F 9/445* (2006.01)

(52) U.S. Cl.
USPC ............ 713/2; 713/1; 709/220; 717/171; 717/176

(58) Field of Classification Search
USPC ............... 713/1, 2; 709/220; 717/171, 176
See application file for complete search history.

(56) References Cited

U.S. PATENT DOCUMENTS

| | | | |
|---|---|---|---|
| 5,991,847 A * | 11/1999 | Ballard et al. ............... 711/3 |
| 6,430,685 B1 * | 8/2002 | Yu et al. ............... 713/1 |
| 6,711,676 B1 * | 3/2004 | Zomaya et al. ............... 713/100 |
| 7,117,355 B2 | 10/2006 | Zomaya et al. |
| 7,127,597 B2 | 10/2006 | Backman et al. |
| 7,506,149 B2 * | 3/2009 | Rothman et al. ............... 713/2 |
| 7,865,579 B2 | 1/2011 | Birse et al. |
| 2004/0153639 A1 * | 8/2004 | Cherian et al. ............... 713/2 |
| 2006/0129797 A1 | 6/2006 | Durfee et al. |

OTHER PUBLICATIONS

NTLDR, retrieved from http://en.wikipedia.org/wiki/Boot.ini, Jun. 6, 2005.*
WIPO, International Search Report, dated May 25, 2009, PCT/US2008/075205, filed Sep. 4, 2008.

* cited by examiner

*Primary Examiner* — Stefan Stoynov

(57) ABSTRACT

Exemplary embodiments of the present invention disclosed herein relate to a method and system for providing data in response to a request. An exemplary method comprises receiving a request for data and determining whether the request contains a specific pattern of data intended to enable a patching process. The exemplary method further comprises providing a response containing patched data if the request contains the specific pattern of data and providing a response containing un-patched data if the request does not contain the specific pattern of data.

14 Claims, 3 Drawing Sheets

200

SYSTEM AND METHOD FOR SUPPORTING MULTIPLE HARDWARE PLATFORMS WITH A SINGLE DISK IMAGE

BACKGROUND

When managing a network comprising a large number of computers, it is convenient to rely on as few disk drives or disk drive images as possible. Each disk drive or disk drive image contains an operating system (OS) and may contain application programs as well. However, operating systems do not typically support heterogeneous hardware configurations. Moreover, operating systems are typically designed to load on a single hardware platform. As one example, Microsoft OSes do not generally support heterogeneous hardware platforms.

Known methods of supporting multiple hardware platforms with a single disk image all have limitations. For example, one known system stores every needed driver for each hardware platform in the network on a particular hard disk drive (HDD). Such a system typically requires some sort of hardware recognition logic in the OS, such as Plug-N-Play or probing.

However, especially for Windows OSes, the base components loaded by each type of hardware platform need to be the same. This currently prevents using the complete set of features of all the platforms. For example, it is sometimes possible to boot mono-core and multi-core processors from the same HDD (shared or cloned), but only one core would be used by the multi-core processors. Furthermore, it is sometimes not possible to use a single set of base components for all the hardware platforms. Moreover, some recent platforms might have incompatibilities that prevent them from being operated with base components made for earlier platforms, resulting in the requirement to manage several master HDDs or HDD images.

One known solution relates to creating a set of drivers that has the highest degree of compatibility with all hardware platforms in a network. A problem with this approach is that newer features tend to not be supported. For example, if the network includes platforms that are compatible with the Advanced Configuration and Power Interface (ACPI) standard, as well as hardware platforms that are not compatible with ACPI, the ACPI functionality will not function on any system, including the ACPI-compatible systems.

OSes typically provide ways to manually load different configurations. For example, the Windows XP Embedded OS provides a way to specify in a boot descriptor such as the BOOT.INI file which hardware abstraction layer (HAL) and kernel files to use. HAL and kernel properties make it possible for the OS to use numerous features, such as ACPI features, Programmable Interrupt Controller (PIC) features or Advanced Programmable Interrupt Controller (APIC) features, and/or mono-core or multi-core processing capabilities, for instance. However, there is no support for automatically loading the correct set of base components. Moreover, the loading of a correct set of base components is only a manual process that requires user input.

Automating the process of loading base components is not possible at the OS level or boot loader level because the OS is not loaded at all at that time. A software tool known as Windows XP Embedded Target Designer offers the ability to specify a set of drivers that may be used to operate heterogeneous hardware platforms. However, the HAL and kernel files are fixed and cannot be changed. Moreover, one HAL and one kernel file must be specified to be used for the various hardware platforms that will boot a particular instance of Windows XP Embedded or a clone of it. This raises a number of issues, including performance problems and/or incompatibilities that may lead to a need to have several Windows XP Embedded images to deploy and maintain just in order to support two different files. As one example, a HALACPI.DLL file may be maintained for platforms having mono-core processors, and a HALMACPI.DLL file may be maintained for platforms that have multi-core processors.

In Linux/Unix OSes, a compact disk (CD) or digital versatile disk (DVD) may be specially implemented to boot a Linux OS without previously knowing which OS platform is needed for a particular hardware platform. This avoids the need for hardware detection mechanisms. However, such a process is complex and requires extensive software development.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

In accordance with an exemplary embodiment of the present invention, support for booting heterogeneous hardware platforms having different hardware configurations using a single HDD image is facilitated by dynamically specifying which base components to load. Information read from the HDD is dynamically modified so that the correct base components are loaded for each different hardware platform in the system.

Figure 1:
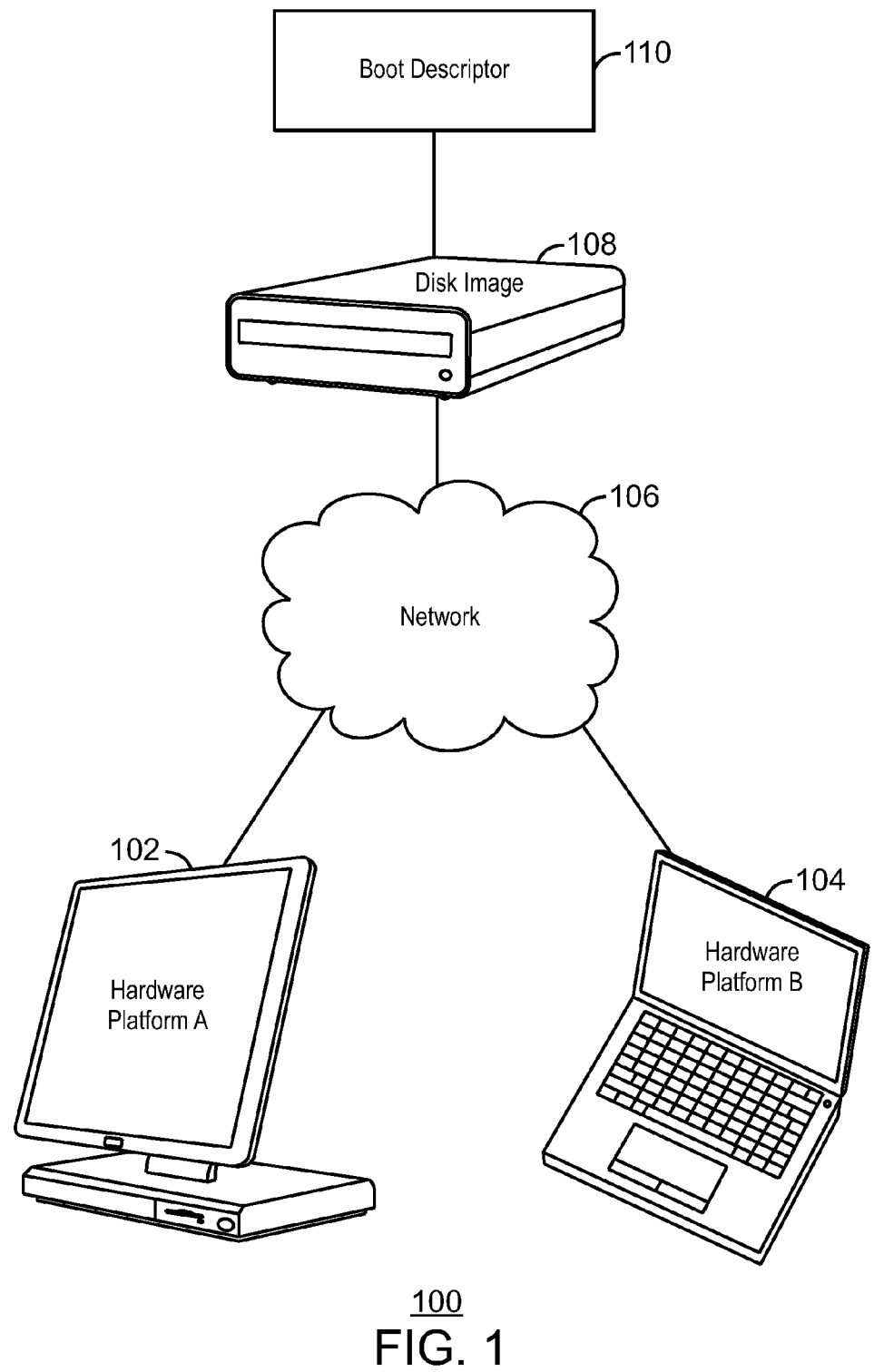
FIG. 1 is a block diagram of a computer network in which multiple hardware platforms are supported by a single virtual disk image in accordance with an exemplary embodiment of the present invention.

FIG. 1 is a block diagram of a computer network in which multiple hardware platforms are supported by a single virtual disk image in accordance with an exemplary embodiment of the present invention. The block diagram is generally referred to by the reference number 100. The network shown in FIG. 1 may comprise a large number of computer systems, although only two systems are shown for purposes of simplicity. A first hardware platform A 102 and a second hardware platform B 104 are connected via a network 106 to a single disk image 108. The first hardware platform A 102 and the second hardware platform B 104 each comprise a processor and at least one tangible, machine-readable storage medium that stores machine-readable instructions designed to be executed by the processor. The first hardware platform A 102 has a different hardware configuration relative to the second hardware platform B 104. For example, the first hardware platform A 102 may comprise a mono-core processor and the second hardware platform B 104 may comprise a multi-core processor.

In one exemplary embodiment of the present invention, at least one of the first hardware platform A 102 or the second hardware platform B 104 comprises a thin client computing system. Thin clients are computing devices that function as an access device on a network. Thin clients are typically solid-state devices that connect over a network such as the network 106 to a server that has a disk image 108. The server performs the bulk of the processing for the thin client. Thin clients typically have no hard drive, allowing for secure storage of data and applications on the server. Keystrokes, mouse events and screen images are typically the only information that is sent between the thin client and server.

As set forth above, modern OSes typically provide ways to manually load different configurations, usually by employing parameters specified in a boot descriptor 110. The boot descriptor 110 is a file stored within the disk image 108 that tells a boot loader where to find the OS, as well as specifying other parameters needed to initialize the OS. One example of a boot descriptor is the BOOT.INI file in Windows NT/2000/XP/2003 OSes. Another example of a boot descriptor is the MENU.LST file, which is a file used by some Linux implementations. The MENU.LST file may be used to specify boot parameters, such as "noacpi" (which will instruct the Linux kernel not to use the ACPI functions in the computer). An exemplary embodiment of the present invention provides a way to dynamically patch boot options by way of modifying the result of the read request sent to the HDD. After the configuration information is patched, program control may be passed to a boot loader. A boot loader is a program that is responsible for loading an OS after the initialization of computer hardware when a computer system is first turned on.

In an exemplary embodiment of the present invention, an identifier such as a media access control (MAC) address or a globally unique identifier (GUID) of a computer system is used to identify which parameters to use when booting the system. A low level detection scheme such as detecting the identifier using basic input/output system (BIOS) calls may be used. BIOS calls may be used to determine the identifier by, for example, detecting the motherboard type, the processor type or the chipset type.

In one exemplary embodiment of the present invention, the first hardware platform A 102 has a hardware configuration that requires the HAL file HALACPI.DLL and kernel file NTKRNLOS.EXE. The second hardware platform B 104 requires the HAL file HALAACPI.DLL and kernel file NTKRNLOS.EXE. Those of ordinary skill in the art will appreciate that there are conditions when neither the first hardware platform A 102 nor the second hardware platform B 104 can operate with the HAL file used by the other.

In a typical computer system, the names of the HAL file and kernel file to use for booting can be specified in a boot descriptor such as a BOOT.INI file. In known systems, a boot descriptor may take the following form:

```
[boot loader]
timeout=30
default=multi(0)disk(0)rdisk(0)partition(1)\WINDOWS
[operating systems]
multi(0)disk(0)rdisk(0)partition(1)\WINDOWS="Microsoft Windows XP
Embedded" /fastdetect /NoExecute=OptIn /HAL=HALACPI.DLL
/KERNEL= NTOSKRNL.EXE
```

According to an exemplary embodiment of the present invention, the boot descriptor 110 is modified relative to known boot descriptors as set forth below:

```
;MAGICstringUSEDtoTRIGGERthePATCHINGprocess
[boot loader]
timeout=30
default=multi(0)disk(0)rdisk(0)partition(1)\WINDOWS
[operating systems]
multi(0)disk(0)rdisk(0)partition(1)\WINDOWS="Microsoft Windows XP
Embedded" /fastdetect /NoExecute=OptIn /HAL=[{%HAL}].DLL
/KERNEL=[{%KNL}].EXE
```

This example is based on a Windows OS. Those of ordinary skill in the art will appreciate, however, that exemplary embodiments of the present invention may be applied to other OSes as well. For example, an exemplary embodiment of the present invention may be applied to a Linux system.

In the above example, MAGICstringUSEDtoTRIGGER-thePATCHINGprocess represents a specific pattern of alphanumeric data that enables a patching process in accordance with an exemplary embodiment of the present invention. The HAL=[{% HAL}].DLL and KERNEL=[{% KNL}].EXE options allow a user to provide a pathway to different HAL and kernel files depending on the specific hardware platform that is accessing the boot descriptor 110.

According to an exemplary embodiment of the present invention, the Windows XP Embedded cannot be loaded using this modified or un-patched BOOT.INI if it is not processed prior to it being delivered to the boot loader. Moreover, an exemplary embodiment of the present invention will patch this BOOT.INI file with the actual names of the HAL file and kernel file to use for booting before it is processed by the boot loader. An example of a patched BOOT.INI file processed by a boot loader of the first hardware platform A 102 is set forth below:

```
MAGICstringUSEDtoTRIGGERthePATCHINGprocess
[boot loader]
timeout=30default=multi(0)disk(0)rdisk(0)partition(1)\WINDOWS
[operating systems]
multi(0)disk(0)rdisk(0)partition(1)\WINDOWS="Microsoft Windows XP
Embedded" /fastdetect /NoExecute=OptIn /HAL=HALACPI.DLL
/KERNEL=NTOSKRNL.EXE
```

Accordingly, the patched boot descriptor read by the first hardware platform A 102 would use the HAL file HALACPI.DLL and the kernel file KERNEL=NTOSKRNL.EXE.

An example of a patched BOOT.INI file processed by a boot loader of the second hardware platform B 104 is set forth below:

```
;MAGICstringUSEDtoTRIGGERthePATCHINGprocess
[boot loader]
timeout=30
default=multi(0)disk(0)rdisk(0)partition(1)\WINDOWS
[operating systems]
multi(0)disk(0)rdisk(0)partition(1)\WINDOWS="Microsoft Windows XP
Embedded" /fastdetect /NoExecute=OptIn /HAL=HALAACPI.DLL
/KERNEL=NTOSKRNL.EXE
```

Accordingly, the patched boot descriptor read by the second hardware platform B 104 would use the HAL file HALAACPI.DLL and the kernel file KERNEL=NTOSKRNL.EXE.

In a more generalized exemplary embodiment of the present invention, the target string to be patched can contain several options, as shown in the following example:

```
multi(0)disk(0)rdisk(0)partition(1)\WINDOWS="Microsoft Windows XP
Embedded" /fastdetect /NoExecute=OptIn [{%HAL and Kernel Options
Strings _%}]
```

This boot descriptor would be patched as follows for the first hardware platform A 102:

```
multi(0)disk(0)rdisk(0)partition(1)\WINDOWS="Microsoft Windows XP
Embedded" /fastdetect /NoExecute=OptIn /HAL=HALACPI.DLL
/KERNEL=NTOSKRNL.EXE
```

Furthermore, the above un-patched boot descriptor would be patched as follows for the second hardware platform B 104:

```
multi(0)disk(0)rdisk(0)partition(1)\WINDOWS="Microsoft Windows XP
Embedded" /fastdetect /NoExecute=OptIn /HAL=HALAACPI.DLL
/KERNEL=NTOSKRNL.EXE
```

According to an exemplary embodiment of the present invention, default behavior of a multi-boot menu could be changed. In addition, a particular boot option could be forced to be the sole option. As one example, entries in the [default] section of a boot descriptor such as a BOOT.INI file could be patched, as could the entire lines in an [operating systems] section of the boot descriptor.

The exemplary embodiment of the present invention shown in FIG. 1 represents a network in which the disk image 108 is stored on a remote virtual HDD. The remote virtual HDD may be operated by an image manager software application (sometimes also called "OS streaming" system). In a system employing a remote virtual HDD, the patching of the boot descriptor with platform-specific information may be done in a number of ways. For example, the patching may be done by a server that operates the remote virtual HDD before the boot descriptor is sent to a requesting client such as the first hardware platform A 102 or the second hardware platform B 104. Alternatively, a real mode boot loader (for example, MPXELDR.BIN) on the requesting client computer may perform the patching when it reads the required sectors prior to delivering the boot descriptor to the boot loader program.

In another exemplary embodiment of the present invention, the real-mode boot loader reads the required sectors and delivers the un-patched boot descriptor to the system memory of the requesting client. Patching is performed in the system memory of the requesting client after the boot loader has requested to read the sectors into a certain memory area but prior to when control is returned to the boot loader after the last sector has been read.

Figure 2:
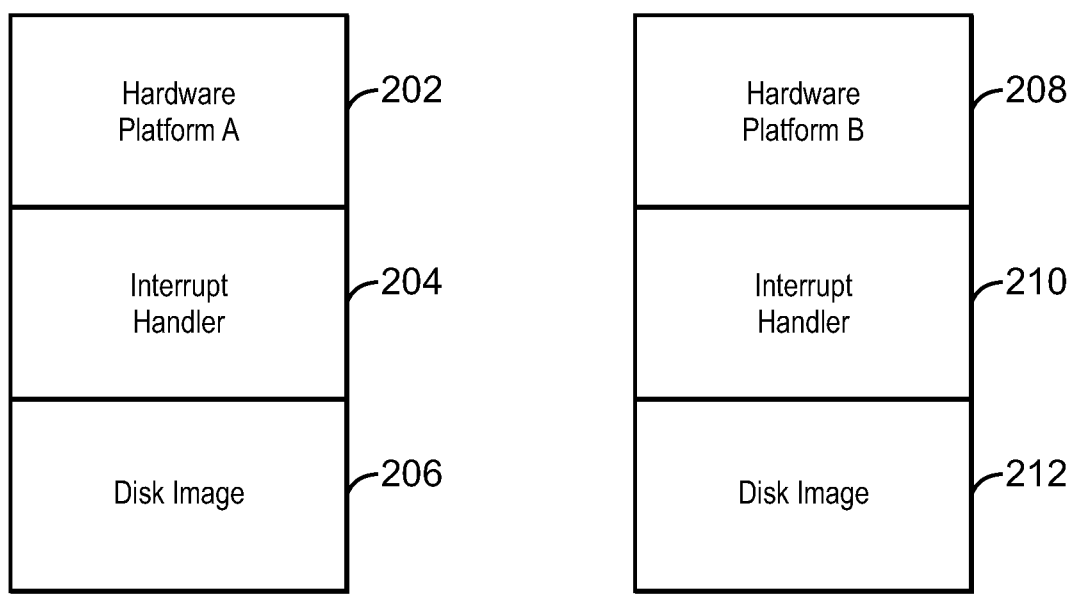
FIG. 2 is a block diagram showing multiple hardware platforms that are supported by identical local disk images in accordance with an exemplary embodiment of the present invention.

FIG. 2 is a block diagram showing multiple hardware platforms that are supported by identical local disk images in accordance with an exemplary embodiment of the present invention. The block diagram is generally referred to by the reference number 200. The block diagram 200 includes a first hardware platform A 202 having an interrupt handler 204 and a local disk image 206. Also shown is a second hardware platform B 208 having an interrupt handler 210 and a local disk image 212. In one exemplary embodiment of the present invention, the interrupt handler 204 and the interrupt handler 210 comprise INT 13h interrupt handlers. For purposes of illustrating the operation of an exemplary embodiment of the present invention, the disk image 206 is defined to be identical to the disk image 212. Additionally, the first hardware platform A 202 has the same requirements with respect to a HAL file and a kernel file as the first hardware platform 102 (FIG. 1) and the second hardware platform B 208 has the same requirements with respect to a HAL file and a kernel file as the second hardware platform 104 (FIG. 1).

In FIG. 2, the disk image 206 is stored on an HDD that is local with respect to the first hardware platform A 202. In one exemplary embodiment of the present invention, the local HDD may comprise a flash drive. The disk image 212 is stored on an HDD that is local with respect to the second hardware platform 208. Both the disk image 206 and the disk image 212 contain a boot descriptor similar to the boot descriptor 110 (FIG. 1).

In the network represented by the block diagram 200, patching of the boot descriptor is performed for the first hardware platform A 202 by the interrupt handler 204. Patching of the boot descriptor is performed for the second hardware platform B 208 by the interrupt handler 210. The interrupt handlers 204, 210 may be coded into the BIOS of the respective hardware platforms. Alternatively, the interrupt handlers 204, 210 may be loaded after a power-on self test (POST) as a result of a modified master boot record (MBR) or modified VBR (Volume Boot Record).

In an exemplary embodiment of the present invention, the interrupt handlers 204, 210 may perform patching of the boot descriptor by modifying sectors comprising the boot descriptor on-the-fly when the sectors are read, but prior to providing the related data to the boot loader. Alternatively, the patching may be performed in system memory after the required sectors have been read. In this case, patching is performed after the boot loader has requested to read the sectors into a certain memory area but prior to giving back the control to the boot loader after the last sector has been read.

After patching of the boot descriptor has been performed by any of the methods described above, the patching process may be disabled to improve system read performance. However, read performance is not significantly reduced even if patching is not disabled. Moreover, the patching process has no impact on read performance after the non-BIOS disk handler such as an HDD controller driver specific to the OS and client has taken control.

In order to make processing easier, a process according to an exemplary embodiment of the present invention is desirably designed to ensure that the data to be patched is not stored on sector-boundaries. In so doing, some potential modifications of the un-patched data at the file system level may be needed. For instance, in systems that employ the NTFS file system, the BOOT.INI file is typically stored directly in a file entry in a master file table (MFT). As such, the BOOT.INI file typically does not begin on a sector boundary. This may mean that un-patched data is undesirably stored on a sector boundary. Thus, a process according to an exemplary embodiment of the present invention comprises a preparation phase to ensure that no un-patched data is stored on a sector boundary. The first step of the preparation phase is to create an un-patched file to store the un-patched data. Next, a determination is made regarding whether any of the un-patched data is stored on a sector boundary. If un-patched data is stored on a sector boundary, the file is re-written so that the un-patched data is not stored on a sector boundary. A determination is then made regarding whether all needed files or data are stored on the HDD or HDD image being used to boot the system. For example, a check may be done to make sure that the specified HAL file and kernel file are present in a SYSTEM 32 folder for a Windows-based system. The /HAL=and /KERNEL=options in the boot descriptor such as the BOOT.INI file may be used for this purpose. A check may also be done to ensure that no file should be named HAL.DLL nor NTOSKRNL.EXE because the Windows boot loader (NTLDR) will overwrite these files as a result of processing of /HAL=and /KERNEL=options. The preparation phase may optionally conclude by installing an interrupt handler to patch a boot descriptor in a system having a local HDD or by activating the patching process in remote virtual HDD server in a system having a remote virtual HDD.

In a general sense, an exemplary embodiment of the present invention provides a way to customize on the fly what a computer reads from a disk drive. As set forth above, the drive may be either a physical drive or a virtual drive. Moreover, an exemplary embodiment of the present invention provides a way to replace, on the fly, all or a portion of at least one sector on a disk drive before the data that are read are actually copied into the memory of the computer that read the data.

Specific items of data are substituted or patched at the sector level so an exemplary embodiment of the present invention does not require any information about the structure of the file system that is used on the disk. Accordingly, data that is not in the file system per se may be customized. In one exemplary embodiment, disk sectors may be addressed by their logical numbers. As one example, information stored on a sector having a standardized definition (for example, the first sector on a disk, which is known as sector 0, is used as the MBR) may be patched with information from another defined sector (for example, the first or last sector of a partition or disk).

An exemplary embodiment of the present invention may be adapted to read from and write to sectors having positions not known in advance, namely data/files in the file system. As described above, a "magic string" may be used to trigger the customization or patching process. The "magic string" represents a specific pattern of alphanumeric data that enables the patching process in accordance with an exemplary embodiment of the present invention. The "magic string" may comprise at least one sector, but is desirably two or three sectors.

Using complete sectors as the "magic area" makes a comparison process to determine whether a received "magic string" matches the specific pattern needed to initiate a patching operation very efficient and fast. Such a comparison may be done without parsing all the data in a sector and having to account for data that could be split by sector boundaries.

In one exemplary embodiment of the present invention that employs a remote virtual HDD and/or served by a server process or hypervisor process or Virtualization process, the comparison process is performed and data patched into an outgoing data transfer before sending the sectors to the client that requested the data.

In an exemplary embodiment of the present invention in which a bootable disk image is stored on a local HDD, a modified interrupt handler may be used to patch the data when the hardware platform is operating in real mode. In OS/protected mode a drive filter device driver (as opposed to a file system filter device driver) is adapted to intercept and modify the data. In systems that employ a Windows OS, such a device driver may be a Class device driver that would be an Upper-Filter to the "Disk" device class.

According to an exemplary embodiment of the present invention, the "magic string" is desirably stored in specific place on the disk that is read by the OS or boot loader before data is to be patched. Moreover, the "magic area" may be positioned at the beginning of a file that must be read when access to customized data is desired.

A system and/or method according to an exemplary embodiment of the present invention may be useful in situations where file system data cannot be relied on. An example of such a situation occurs when a client hardware platform is in its boot loader/OS loader phase. In such a case, an exemplary embodiment of the present invention may prove useful when adding file system support to a process that is adapted to modify data on the fly. Moreover, an exemplary embodiment of the present invention may be employed to simplify the sharing of system disk drives among several clients at the same time because data that needs to be different from one client to another (for example, computer name, security identifiers, UUIDs or the like) can be customized on the fly when using actually the very same "disk data". Furthermore, an exemplary embodiment of the present invention may be useful in facilitating shared storage in virtual desktop infrastructure (VDI) farms.

One exemplary embodiment of the present invention may be adapted to customize files or data that are not accepting comments or data that is not meaningful for processes that will use the files or data. Examples of such files include a binary file (for example, an executable file) or a data file in a specific format that does not accept comments, such as files from a database system, a binary configuration file (for example, a registry file) or the like.

To facilitate replacing or patching data in files that do not accept comments, the first two or three sectors of the file may be replaced with a "magic pattern" that signals a dynamic customization operation. The "magic pattern" may include data that describes specific actions to be taken by the code that performs the patching operation. The "magic pattern" may also include data that would instruct the code that performs the patching operation on the location of the original sectors that have been replaced by the "magic pattern". The replaced sectors may be stored in a special file if a file system is available. Alternatively, the replaced sectors may be given sector numbers in a special partition or in unitary sectors that a virtual disk server could access. It may be desirable to store the original size and number of replaced sectors so that the correct number of sectors can be read. Also, storing the number of replaced sectors facilitates improved allocation of memory buffers by read processes.

In one exemplary embodiment of the present invention, a file system stack is available to the code that is performing a patching operation. In such a case, patching may be accomplished using file system filters, file application programming interfaces (APIs), system hooks or the like. If Windows Registry customization is desired, APIs that allow monitoring, interception and manipulation of Registry data should be available.

In one exemplary embodiment of the present invention, boot configuration data (BCD) may replace the BOOT.INI configuration file. Those of ordinary skill in the art will appreciate that BCD files are not text files and do not accept comments.

Processing BCD data may be performed using tools such as BCDEDIT, Regedit and registry API to prepare customized BCD files that may be stored elsewhere than where the unmodified BCDs are stored. For example, the modified BCD files may be stored on the server side (respectively the host side) if the HDD is remote (respectively a virtual disk used by an hypervisor such as VMWare ESX or a Virtualizer such as VMWare workstation).

The initial BCD files stored on the physical media can be modified so that at least the three first sectors comprise a specified string of alphanumeric data signaling that a patching operation is to be performed. The remaining sectors in the BCD could be replaced by a pattern that would instruct the reading process to go on with the replacement data. The reading process would read these patterns and actually fetch the corresponding modified BCD files. The modified BCD files could be sent in place of the unmodified original BCD files.

In one exemplary embodiment of the present invention, the original BCD files and the modified BCD files have the same size. The file system may report the size of the BCD file to read so that the OS can allocate the corresponding buffers to read them. Thus, a preparation phase might include a step in which all boot options are included in the regular BCD file. Examples of boot options include a boot option that would specify HALAACPI, another that would specify HALMACPI, another that would specify HALACPI or the like. All the modified BCD files could then be similar, with only the default boot option changing in each of them. Once all of the BCD files are obtained with the corresponding default boot option, the original unmodified BCD file may be overwritten.

Figure 3:
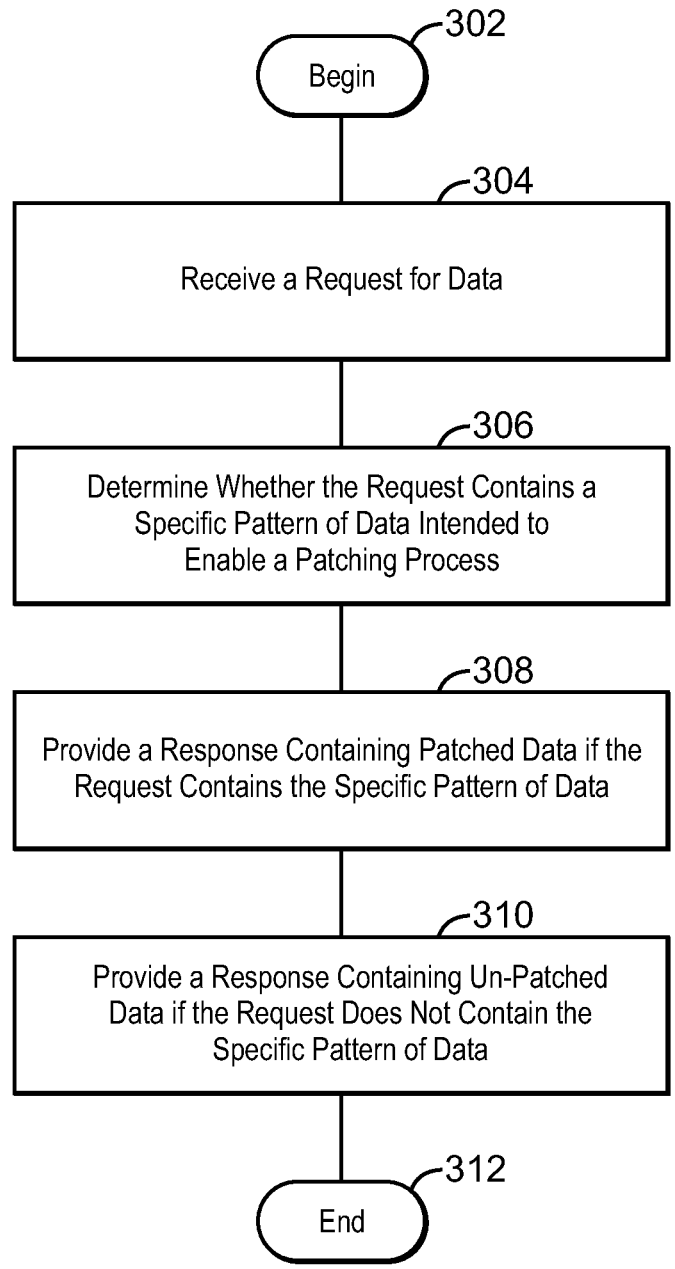
FIG. 3 is a process flow diagram showing a method of supporting multiple hardware platforms using a single disk image in accordance with an exemplary embodiment of the present invention.

FIG. 3 is a process flow diagram showing a method of supporting multiple hardware platforms using a single disk image in accordance with an exemplary embodiment of the present invention. The method is generally referred to by the reference number 300. At block 302, the process begins.

At block 304, a request for data is received. The request for data may comprise a request for boot information. At block 306, a determination is made regarding whether the request contains a specific pattern of data intended to enable a patching process.

A response containing patched data is provided if the request contains the specific pattern of data, as shown at block 308. Finally, a response containing un-patched data is provided if the request does not contain the specific pattern of data, as shown at block 310. The process ends at block 312.

A system and method in accordance with an exemplary embodiment of the present invention provides a significant enhancement over existing solutions for supporting heterogeneous hardware platforms using a single disk drive (or clones of a unique master disk drive). Moreover, the number of master disk drive images that are deployed and maintained in a given computer network can be reduced. For users of large networks, the return on investment provided by an exemplary embodiment of the present invention may be significant.

What is claimed is:

1. A method of providing data in response to a request, the method comprising:
   receiving a request for data;
   determining whether the request contains a specific pattern of data intended to enable a patching process, wherein the specific pattern comprises at least one complete sector;
   providing a response containing patched data if the request contains the specific pattern of data; and
   providing a response containing un-patched data if the request does not contain the specific pattern of data.

2. The method recited in claim 1, wherein the patched data comprises a boot descriptor.

3. The method recited in claim 2, wherein the boot descriptor comprises a BOOT.INI file.

4. The method recited in claim 1, wherein the patched data comprises boot configuration data.

5. The method recited in claim 1, wherein the request for data is received from a computer system and wherein program control of the computer system is passed to a boot loader program after receipt of either the patched data or the un-patched data by the computer system.

6. The method recited in claim 1, comprising generating the request with a basic input/output system.

7. The method recited in claim 1, comprising generating the request with an interrupt handler.

8. The method recited in claim 1, comprising initializing a computer system using the patched data.

9. A computer system, comprising:
   a processor; and
   a tangible non-transitory machine-readable storage medium that stores
      machine-readable instructions for execution by the processor, the
      machine-readable instructions comprising:
         code that is adapted to_receive a request for data,
         code that is adapted to determine whether the request contains a specific pattern of data intended to enable a patching process,
         code adapted to provide a response containing patched data if the request contains the specific pattern of data, and
         code adapted to provide a response containing un-patched data if the request does not contain the specific pattern of data.

10. The computer system of claim 9, wherein the patched data comprises a boot descriptor.

11. The computer system of claim 10, wherein the boot descriptor comprises a BOOT.INI file.

12. The computer system of claim 9, wherein the patched data comprises boot configuration data.

13. The computer system of claim 9, wherein computer system is a first computer system and the request for data is received from a second computer system and wherein program control of the second computer system is passed to a boot loader program after receipt of either the patched data or the un-patched data by the second computer system.

14. The computer system of claim 9, comprising code that is to generate the read request with:
   a basic input/output system;
   an interrupt handler; or
   any combination thereof.

* * * * *

UNITED STATES PATENT AND TRADEMARK OFFICE
CERTIFICATE OF CORRECTION

PATENT NO. : 8,612,737 B2
APPLICATION NO. : 13/055711
DATED : December 17, 2013
INVENTOR(S) : Yves Gattegno et al.

It is certified that error appears in the above-identified patent and that said Letters Patent is hereby corrected as shown below:

In the Claims

In column 10, line 27, in Claim 9, delete "to_receive" and insert -- to receive --, therefor.

In column 10, line 50, in Claim 14, before "request" delete "read".

Signed and Sealed this
Twenty-fourth Day of June, 2014

Michelle K. Lee
*Deputy Director of the United States Patent and Trademark Office*